(12) United States Patent
Zacks et al.

(10) Patent No.: US 12,395,508 B2
(45) Date of Patent: Aug. 19, 2025

(54) REDIRECTING DATA TRAFFIC TO ENDPOINTS BASED ON RISK

(71) Applicant: Cisco Technology, Inc., San Jose, CA (US)

(72) Inventors: David John Zacks, Vancouver (CA); Thomas Szigeti, Vancouver (CA); Rachana Anubhav Soni, San Ramon, CA (US); Hemamalini Subash, Alviso, CA (US)

(73) Assignee: Cisco Technology, Inc., San Jose, CA (US)

( * ) Notice: Subject to any disclaimer, the term of this patent is extended or adjusted under 35 U.S.C. 154(b) by 130 days.

(21) Appl. No.: 17/886,429

(22) Filed: Aug. 11, 2022

(65) Prior Publication Data

US 2024/0056461 A1   Feb. 15, 2024

(51) Int. Cl.
*H04L 9/40* (2022.01)
*H04L 67/1008* (2022.01)

(52) U.S. Cl.
CPC ...... *H04L 63/1425* (2013.01); *H04L 63/1433* (2013.01); *H04L 67/1008* (2013.01)

(58) Field of Classification Search
CPC ............ H04L 63/1433; H04L 67/1012; H04L 67/1008; H04L 67/1004; H04L 67/1001; H04L 67/10015; H04L 67/1031; H04L 67/1029
See application file for complete search history.

(56) References Cited

U.S. PATENT DOCUMENTS

| | | |
|---|---|---|
| 11,159,576 B1 | 10/2021 | Ly et al. |
| 2017/0104789 A1* | 4/2017 | Cudak ................ H04L 63/1433 |
| 2017/0104815 A1* | 4/2017 | Tao ..................... H04L 67/1029 |
| 2019/0238633 A1 | 8/2019 | Rao et al. |
| 2020/0259792 A1 | 8/2020 | Devarajan et al. |
| 2021/0306393 A1 | 9/2021 | Muniyappa et al. |
| 2022/0027469 A1 | 1/2022 | Vivekanandan et al. |
| 2022/0109696 A1 | 4/2022 | Deshmukh et al. |

* cited by examiner

*Primary Examiner* — Olugbenga O Idowu
(74) *Attorney, Agent, or Firm* — Lee & Hayes, P.C.

(57) ABSTRACT

This disclosure describes techniques for redirecting data traffic based on endpoint risk. An example method includes determining a risk associated with a first endpoint connected to a redirection point; determining that the risk exceeds a threshold; and based on determining that the risk exceeds the threshold, causing the redirection point to direct data traffic to a second endpoint and to refrain from directing the data traffic to the first endpoint.

20 Claims, 6 Drawing Sheets

REDIRECTING DATA TRAFFIC TO ENDPOINTS BASED ON RISK

TECHNICAL FIELD

The present disclosure relates generally to techniques for causing redirection points to selectively redirect data traffic to endpoints based on security risks associated with the endpoints.

BACKGROUND

Data traffic transmitted through a network (e.g., a cloud-based network) toward a service is often directed to an endpoint by a redirection point, such as a load balancer. The redirection point is configured to distribute the data traffic to back-end servers hosting the service on an as-needed basis.

Security risk may arise on the servers. For example, if a security vulnerability is identified in a version of a hypervisor executed by the servers, the servers themselves may be vulnerable. In general, these types of security vulnerabilities are resolved on different servers over time, to prevent all of the servers in the network from being updated and offline at the same time. As a result, different servers may have different associated security risks during gradual fleet updates.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1:
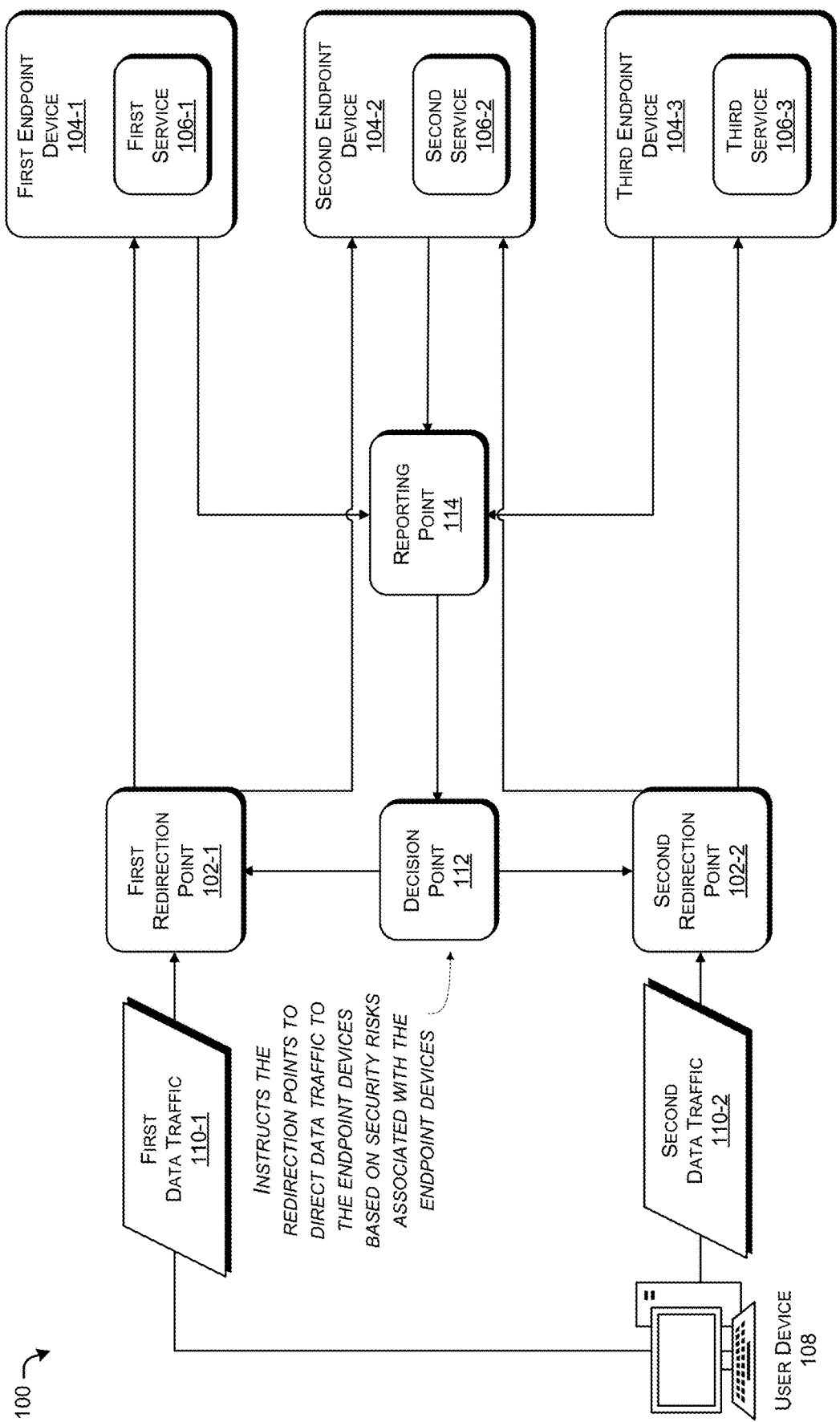
FIG. 1 illustrates an example environment for selectively directing data traffic to endpoints according to risk.

This disclosure describes techniques for redirecting data traffic based on endpoint risk. An example method includes determining a risk associated with a first endpoint connected to a redirection point; determining that the risk exceeds a threshold; and based on determining that the risk exceeds the threshold, causing the redirection point to direct data traffic to a second endpoint and to refrain from directing the data traffic to the first endpoint.

In some cases, wherein determining the risk associated with the first endpoint comprises includes that the endpoint is associated with an outdated version of hardware and/or software. The second endpoint may be associated with an updated version of the hardware and/or software.

According to various implementations, the determining the risk associated with the first endpoint includes determining that the first endpoint is associated with a security vulnerability.

In some examples, determining the risk associated with the first endpoint includes: receiving, from the first endpoint, a report indicating an update performed on the first endpoint; and determining the risk associated with the first endpoint based on the report.

In some instances, the first endpoint includes at least one of a first server, a first access point, or a first base station, and the second endpoint comprises at least one of a second server, a second access point, or a second base station.

According to various examples, the redirection point includes at least one of a load balancer, a cloud access service broker (CASB), or a reverse proxy.

In some cases, the risk is a first risk, and the method further includes: determining a second risk associated with the second endpoint; and determining that the second risk is below the threshold.

In some examples, the data traffic is first data traffic, and the method further includes: receiving, from the first endpoint, a report indicating an update to the first endpoint; decreasing the risk associated with the first endpoint based on the report; based on decreasing the risk associated with the first endpoint, determining that the risk associated with the first endpoint is below the threshold; and based on determining that the risk associated with the first endpoint is below the threshold, causing the redirection point to direct second data traffic to the first endpoint.

The example method, for instance, may be performed by a system that includes at least one processor. For instance, instructions for performing the example method are stored in memory and executed by the at least one processor.

Example Embodiments

This disclosure describes various techniques for redirecting data traffic to endpoints according to risks associated with the endpoints. In various networks, a redirection point (e.g., a load balancer) is configured to distribute data traffic to multiple endpoints according to various policies. However, conventional redirection points are unable to assess the security risks associated with those endpoints. Thus, a conventional redirection point may expose sensitive data traffic to various security vulnerabilities associated with endpoints to which the redirection point forwards the sensitive data traffic.

In various implementations of the present disclosure, a decision point determines security risks associated with endpoints in a network. For instance, the decision point may determine that one endpoint is operating using outdated software that is associated with a known security vulnerability, and another endpoint is operating using updated software in which the known security vulnerability has been patched. The decision point may direct a redirection point to forward data traffic to the endpoints based on the risks. For instance, the decision point may instruct the redirection point to refrain from forwarding data traffic to the endpoint that is operating the outdated software. As a result, the redirection point may behave in a manner that specifically protects data traffic from security vulnerabilities in the network.

Examples described herein are directed to specific technical improvements in the field of computer security. Using various architectures and signaling described herein, a network can respond promptly when a security vulnerability at an endpoint is identified by controlling an associated redirection point. Unlike previous techniques, implementations of the present disclosure prevent exposure of data traffic to endpoints that are associated with known security vulnerabilities. Accordingly, various implementations described herein are directed to specific practical applications in the field of computer networking and security.

Various implementations of the present disclosure will be described in detail with reference to the drawings, wherein like reference numerals present like parts and assemblies throughout the several views. Additionally, any samples set forth in this specification are not intended to be limiting and merely demonstrate some of the many possible implementations.

FIG. 1 illustrates an example environment 100 for selectively directing data traffic to endpoints according to risk. The environment 100 includes multiple redirection points, such as a first redirection point 102-1 and a second redirection point 102-2. As used herein, the term "redirection point," and its equivalents, may refer to an entity that is configured to distribute data between multiple endpoints. An example redirection point, for instance, may be a load balancer, a cloud access security broker (CASB), a reverse proxy, or the like. The first and second redirection points 102-1 and 102-2 may be embodied in hardware, software, or a combination thereof.

In various implementations, the first redirection point 102-1 is configured to distribute data traffic to a first endpoint device 104-1 and a second endpoint device 104-2, whereas the second redirection point 102-2 is configured to distribute data traffic to the second endpoint device 104-2 and a third endpoint device 104-3. As used herein, the term "endpoint," and its equivalents, may refer to an entity that is configured to transmit and/or receive data. Examples of endpoints include user equipment (UE), computers, base stations access points (APs), servers, compute nodes, and other data center resources. According to some examples, an endpoint is embodied in software (e.g., as an application, service, virtual machine (VM), or the like) and/or hardware (e.g., as an independent computing device, UE, AP, or the like). According to some cases, an endpoint is further configured to transmit data to another endpoint. For example, an AP endpoint may further transmit data to a UE that is also an endpoint. In various cases, the first to third endpoint devices 104-1 to 104-3 are embodied in hardware. For example, each one of the first to third endpoint devices 104-1 to 104-3 includes at least one server located in one or more data centers.

The first to third endpoint devices 104-1 to 104-3 are configured to execute software. For example, the first endpoint device 104-1 executes a first service 106-1, the second endpoint device 104-2 executes a second service 106-2, and the third endpoint device 104-3 executes a third service 106-3. The first to third services 106-1 to 106-3 may be applications, VMs, compute resources, or other types of software instances. Although not specifically illustrated in FIG. 1, the first to third endpoint devices 104-1 to 104-3 may further execute additional software and/or firmware, such as operating systems, hypervisors, kernels, and other types of programs.

According to various implementations, a user device 108 transmits first data traffic 110-1 and second data traffic 110-2. The first redirection point 102-1 is configured to distribute the first data traffic 110-1 to the first endpoint device 104-1 (including the first service 106-1) and/or the second endpoint device 104-2 (including the second service 106-2) based on one or more first policies, such as based on available processing capacity of the first endpoint device 104-1 and the second endpoint device 106-1, a congestion level of one or more communication networks connected to the first endpoint device 104-1 and/or the second endpoint device 104-2, or the like. Similarly, the second redirection point 102-2 is configured to distribute the second data traffic 110-1 to the second endpoint device 104-2 and/or the third endpoint device 104-3 based on one or more second policies. The first and second policies may relate to distributing the first and second data traffic 110-1 and 110-2 efficiently within the environment 100.

However, in some examples, the first to third endpoint devices 104-1 to 104-3 may not be equivalent with respect to their respective security risks. For example, the second endpoint device 104-2 may include an outdated version of a central processing unit (CPU) that is associated with a known security vulnerability, whereas the first endpoint device may include an updated version of the CPU that is without the known security vulnerability. In some instances, the third service 106-3 is up-to-date on a software update that patches a security vulnerability, whereas the second service 106-2 is not up-to-date on the software update. Thus, if the first redirection point 102-1 treats the first endpoint device 104-1 and the second endpoint device 104-2 equivalently for the purposes of distributing the first data traffic 110-1, the first redirection point 102-1 may expose the first data traffic 110-1 to the security vulnerability of the second endpoint device 104-2. In addition, if the second redirection point 102-2 treats the second service 106-2 and the third service 106-3 equivalently, the second redirection point 102-2 may expose the second data traffic 110-2 to any vulnerabilities addressed by the security update.

In various implementations of the present disclosure, a decision point 112 instructs the first and second redirection points 102-1 and 102-2 to distribute the first and second data traffic 110-1 and 110-2 to the first to third endpoint devices 104-1 to 104-3 (including the first to third services 106-1 to 106-3) based on risks associated with the first to third endpoint devices 104-1 to 104-3 and/or the first to third services 106-1 to 106-3. The decision point 112 may be implemented in software and/or hardware. As used herein, the terms "risk," "security risk," and their equivalents refer to a metric that is indicative of the vulnerability of an asset to exposure, modification, control, or damage inflicted by an unauthorized entity. For example, an asset that requires multi-factor authentication (MFA) prior to accessing its data may have a lower risk than an asset that does not require MFA.

A reporting point 114 may receive data indicating statuses of the first to third endpoint devices 104-1 to 104-3 and/or the first to third services 106-1 to 106-3. The reporting point 114 is implemented in software and/or hardware. In some cases, the reporting point 114 is integrated with, or part of, the decision point. The statuses may indicate versions of and/or updates performed on the first to third endpoint devices 104-1 to 104-3 and/or the first to third services 106-1 to 106-3. In some implementations, the reporting point 114 requests the statuses by transmitting status requests to the first to third endpoint devices 104-1 to 104-3. In some examples, the first to third endpoint devices 104-1 to 104-3 transmit the statuses to the reporting point 114 repeatedly, periodically (e.g., once a day, once a week, etc.), or in response to updates being performed on the first to third endpoint devices 104-1 to 104-3 and/or to the first to third services 106-1 to 106-3. In particular cases, a security administrator or other user manually inputs one or more of the statuses into the reporting point 114.

The reporting point 114 may generate a report based on the statuses and transmit the report to the decision point 112. In various implementations, the reporting point 114 transmits the report repeatedly, periodically (e.g., once a day, once a week, etc.), or in response to an event (e.g., one or more of the statuses being received by the reporting point). The report may indicate the statuses of multiple endpoint devices among the first to third endpoint devices 104-1 to 104-3 and/or multiple services among the first to third services 106-1 to 106-3.

The decision point 112 calculates, based on the report, the risks of various endpoints within the environment 100, such as the first to third endpoint devices 104-1 to 104-3 and the first to third services 106-1 to 106-3. In various cases, endpoints with more recent versions of software and/or hardware may be associated with lower risks than endpoints with older versions of software and/or hardware. According to some examples, endpoints with particular software and/or hardware associated with known security vulnerabilities may be associated with higher risks than endpoints without the particular software and/or hardware. In some implementations, the risks are calculated using the Common Vulnerability System Scoring (SVSS) method, or some other method for calculating risk score.

In some cases, the risk associated with a particular endpoint may be so high that it poses a significant danger to the first data traffic 110-1 and/or the second data traffic 110-2. For instance, the decision point 112 may determine that the risk exceeds a threshold. In some cases, the threshold is pre-stored in the decision point 112 or a datastore connected to the decision point 112. The decision point 112 may transmit instructions to the first redirection point 102-1 and/or the second redirection point 102-2 to refrain from directing the first data traffic 110-1 and/or the second data traffic 110-2 to the particular endpoint. By following these instructions, the first redirection point 102-1 and/or the second redirection point 102-2 may selectively forward the first data traffic 110-1 and/or the second data traffic 110-2 to endpoints that are relatively safe, and prevent the first data traffic 110-1 and/or the second data traffic 110-2 from being exposed to unauthorized entities.

Particular examples will now be described with reference to FIG. 1. In these examples, the first endpoint device 104-1 includes a CPU that includes features that mitigate vulnerabilities to microarchitectural timing side-channel attacks (e.g., Spectre and/or Meltdown vulnerabilities). However, the second endpoint device 104-2 includes a CPU that was designed prior to these vulnerabilities being recognized. In some cases, the CPU included in the second endpoint device 104-2 is a previous generation CPU, whereas the CPU included in the first endpoint device 104-1 is a current generation CPU. In some cases, the first endpoint device 104-1 and the second endpoint device 104-2 are controlled by the same cloud provider, but may be in different data centers. For instance, the cloud provider may be rolling out CPU updates gradually to the different data centers, such that the second endpoint device 104-2 is in a data center that has not yet been updated.

The reporting point 114 may query the first endpoint device 104-1 and the second endpoint device 104-2 about their respective hardware. The first endpoint device 104-1 may transmit data indicating that the first endpoint device 104-1 includes the current generation CPU, and the second endpoint device 104-2 may transmit data indicating the second endpoint device 104-2 includes the previous generation CPU. The reporting point 114 may transmit a report indicating the CPU versions to the decision point 112.

In various cases, the decision point 112 may determine a risk of the first endpoint device 104-1 and a risk of the second endpoint device 104-2 based, at least in part, on the types of CPUs utilized by the first endpoint device 104-1 and the second endpoint device 104-1. For instance, a risk of the first endpoint device 104-1 is lower than the risk of the second endpoint device 104-2, due to the current generation CPU utilized by the first endpoint device 104-1 and the ongoing microarchitectural timing side-channel attack vulnerabilities of the CPU of the second endpoint device 104-2. In some examples, the decision point 112 compares the risk associated with the second endpoint device 104-2 to a threshold. The threshold, for instance, may be user-specified, selected based on a sensitivity of the first data traffic 110-1, selected based on the risk associated with other endpoint devices (e.g., the first endpoint device 104-1), or the like. The decision point 112 may further compare the risk associated with the first endpoint device 104-1 to the threshold. In various implementations, the decision point 112 determines that the risk associated with the second endpoint device 104-2 is greater than the threshold and/or that the risk associated with the first endpoint device 104-1 is lower than the threshold.

The decision point 112 may transmit an instruction to the first redirection point 102-1 to avoid directing the first data traffic 110-1 to the second endpoint device 104-2 and/or to direct the first data traffic 110-1 to the first endpoint device 104-1. The first redirection point 102-1 may adjust the first policies based on the instruction from the decision point 112. In some cases, the first direction point 102-1 may forward the first data traffic 110-1 to the first endpoint device 104-1 and may refrain from forwarding the first data traffic 110-1 to the second endpoint device 104-2. Because different types of data traffic may be more sensitive than others to the vulnerabilities in the second endpoint device 104-2, the first redirection point 102-1 may confirm that the first data traffic 110-1 has a sensitivity that is greater than a threshold prior to preventing the first data traffic 110-1 from being forwarded to the second endpoint device 104-2. For example, if the decision point 112 and/or the first redirection point 102-1 determines that the first data traffic 110-1 includes confidential transactions, high-value transactions, data with PII, or other indicators of high sensitivity to exposure, the first redirection point 102-1 may prevent the first data traffic 110-1 from being forwarded to the second endpoint device 104-2. However, if the decision point 112 and/or the first redirection point 102-1 determines that the first data traffic 110-1 includes and/or consists of non-confidential information, such as a non-confidential media item, the first redirection point 102-1 may forward the first data traffic 110-1 to the second endpoint device 104-2.

In some particular cases, the second service 106-2 of the second endpoint device 104-2 may be recently updated with a patch to a security vulnerability associated with the second service 106-2. In contrast, the third service 106-3 of the third endpoint device 104-3 may not yet have been updated with the patch. The second endpoint device 104-2 may transmit data indicating the updated second service 106-2 to the reporting point 114. Similarly, the third endpoint device 104-3 may transmit data indicating the version of the third service 106-3 that is operating on the third endpoint device 104-3, which has not been updated with the patch. The reporting point 114 may transmit a report indicating the update statuses of the second service 106-2 and the third service 106-3 to the decision point 112.

In various implementations, the decision point 112 may generate and/or update the risks associated with the second endpoint device 104-2 and the third endpoint device 104-3 based on the report from the reporting point 114. For example, the decision point 112 may decrease the risk associated with the second endpoint device 104-2 based on the updated second service 106-2. The decision point 112 may generate a risk associated with the third endpoint device 104-3 that is higher than the risk associated with the second endpoint device 104-2, due to the outdated third service 106-3 operating on the third endpoint device 104-3. In various implementations, the decision point 112 may compare the risks of the second endpoint device 104-2 and the third endpoint device 104-3 to a threshold. Upon determining that the risk associated with the second endpoint device 104-2 is lower than the threshold and/or determining that the risk associated with the third endpoint device 104-3 is greater than the threshold, the decision point 112 may transmit an instruction to the second redirection point 102-2 that causes the second redirection point 102-2 to forward the second data traffic 110-2 to the second endpoint device 104-2 and/or to refrain from forwarding the second data traffic 110-2 to the third endpoint device 104-3.

Notably, the risk associated with the second endpoint device 104-2 may be intolerable for the first data traffic 110-1, but may be tolerable for the second data traffic 110-2. Thus, the decision point 112 may generate the instructions based also on the types of data that are handled by the first and second redirection points 102-1 and 102-2.

Although the first and second redirection points 102-1 and 102-2, the first to third endpoint devices 104-1 to 104-3, the user device 108, the decision point 112, and the reporting point 114 are illustrated as separate entities in FIG. 1, implementations are not so limited. In some cases, at least two of the first and second redirection points 102-1 and 102-2, the first to third endpoint devices 104-1 to 104-3, the user device 108, the decision point 112, and the reporting point 114 are collocated on the same physical device.

Furthermore, although FIG. 1 is described such that the endpoint devices 104-1 to 104-3 are single devices connected to the redirection points 102-1 and 102-2, implementations of the present disclosure include broader embodiments. For instance, the first endpoint device 104-1 can represent a chain of devices (e.g., network nodes connected in series) that are communicatively coupled to one another, and the first redirection point 102-1 can selectively forward data traffic to the chain of devices based on the risk associated with at least one of the devices in the chain. As used herein, the terms "node," "network node," and their equivalents, can refer to any entity within a network that can transmit packets to and/or receive packets from at least one other node. A node may be a device, a software instance, a VM, a container, a virtual process, or the like. In some examples, a node may include a grouping of devices or virtual resources, such as security groups, subnetworks, and so forth. In some examples, a node can be a client, a server, or a combination thereof. In some cases, a node can be a network switch, network router, or the like.

Figure 2:
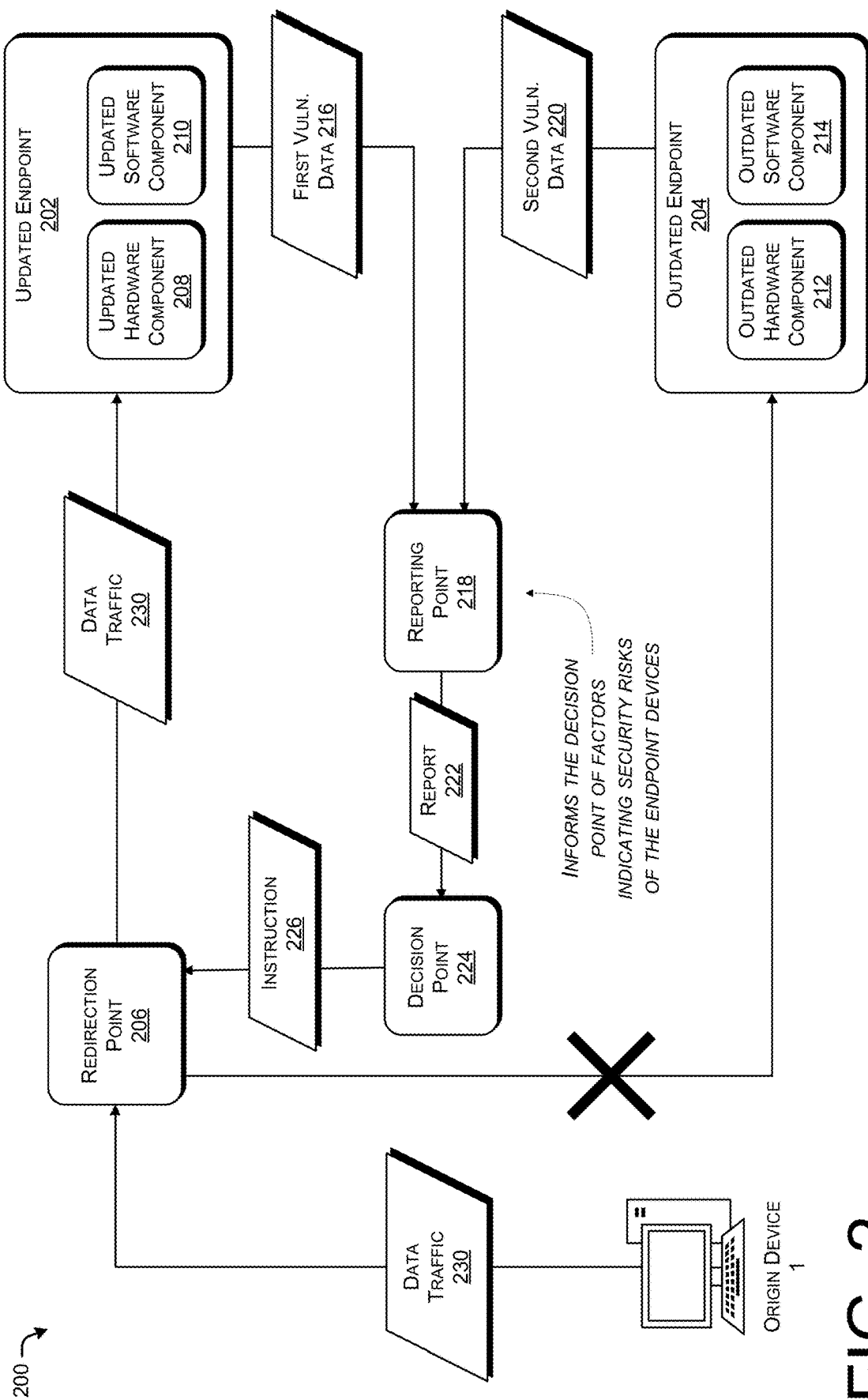
FIG. 2 illustrates example signaling for selectively directing data traffic to endpoints based on the risks associated with the endpoints.

FIG. 2 illustrates example signaling 200 for selectively directing data traffic to endpoints based on the risks associated with the endpoints. The signaling 200 is between various entities that can be embodied in hardware and/or software. In various examples, an example entity may include at least one processor executing instructions. The example entity may further include at least one transceiver that may receive and/or transmit data in the signaling 200 to another entity.

Furthermore, the signaling 200 may include the transmission of data in the form of data packets and/or datagrams over one or more communication networks. As used herein, the term "communication network," and its equivalents, can refer to any network configured to transfer data from one endpoint to another. A communication network may include one or more fiber-optic networks, one or more wired networks, one or more wireless networks, or any combination thereof. Examples of communication networks include, for instance, BLUETOOTH networks, WI-FI networks, 3GPP radio access networks (RANs) (e.g., including an gNodeB, an eNodeB, etc.), core networks (e.g., a $3^{rd}$ Generation Partnership Project (3GPP) core network, such as a $3^{rd}$ Generation (3G) core network, an Evolved Packet Core (EPC), or a 5G Core (5GC), etc.), an IP multimedia subsystem (IMS) network, the Internet, or the like.

An updated endpoint 202 and an outdated endpoint 204 are communicatively to a redirection point 206. The redirection point 206 is communicatively coupled to the updated endpoint 202 and the outdated endpoint 204. In various cases, the redirection point 206 configured to distribute data and/or other processing loads among the updated endpoint 202 and the outdated endpoint 204.

However, the updated endpoint 202 and the outdated endpoint 204 are not equivalent in terms of security risk. The updated endpoint 202 includes an updated hardware component 208 and/or an updated software component 210. The updated hardware component 208 may be a recent version of a CPU, graphics processing unit (GPU), memory chip (e.g., random access memory (RAM)), application-specific integrated circuit (ASIC), input device (e.g., keyboard, touchscreen, etc.), output device (e.g., transceiver, monitor, speaker, etc.), chipset, or some other type of physical component. In various implementations, the updated software component 210 may be a recent version of an operating system, hypervisor, compiler, application, VM, firmware, utility, firewall, or some other set of data that is stored and/or executed by hardware in the updated endpoint 202.

In contrast, the outdated endpoint 204 includes an outdated hardware component 212 and/or an outdated software component 214. The outdated hardware component 212 may be a previous version of a CPU, GPU, memory chip, ASIC, output device, chipset, or some other type of physical component. The outdated software component 214 may be a previous version of an operating system, hypervisor, compiler, application, VM, firmware, utility, firewall, or other set of data that is stored and/or executed by hardware in the outdated endpoint 204. In some cases, the recent versions address one or more security vulnerabilities that are present in the previous versions. Thus, the outdated hardware component 212 and/or the outdated software component 214 may expose data forwarded to the outdated endpoint 204 to at least one security vulnerability.

The signaling 200 illustrated in FIG. 2 can prevent the redirection point 206 from exposing sensitive data to the at least one security vulnerability of the outdated hardware component 212 and/or the outdated software component 214. The updated endpoint 202 may transmit first vulnerability data 216 to a reporting point 218. In various implementations, the first vulnerability data 216 may indicate the updated hardware component 208 and/or the updated software component 210 of the updated endpoint 202. For example, the first vulnerability data 216 may indicate at least one version of the updated hardware component 208 and/or the updated software component 210, at least one manufacturer of the updated hardware component 208 and/or the updated software component 210, a last update of the updated hardware component 208 and/or the updated software component 210, a policy associated with the updated hardware component 208 and/or the updated software component 210, or the like. The outdated endpoint 204 may transmit second vulnerability data 220 to the reporting point 210. The second vulnerability data 220 may indicate the outdated hardware component 212 and/or the outdated software component 214. For example, the second vulnerability data 220 may indicate at least one version of the outdated hardware component 212 and/or the outdated software component 214, at least one manufacturer of the outdated hardware component 212 and/or the outdated software component 214, a last update of the outdated hardware component 212 and/or the outdated software component 214, an policy associated with the outdated hardware component 212 and/or the outdated software component 214, or the like. Examples of policies associated with hardware and/or software component include an access policy, such as whether the hardware and/or software component is protected by a firewall, whether the component requires MFA prior to access, or the like.

In various implementations, the reporting point 218 generates a report 222 based on the first vulnerability data 216 and the second vulnerability data 220. Although not specifically illustrated in FIG. 2, the reporting point 218 may receive additional vulnerability data from other endpoints, and may generate the report 222 additionally based on the additional vulnerability data. The reporting point 218 provides the report 222 to a decision point 224.

The decision point 224 analyzes the report 222. In various cases, the decision point 224 determines whether the redirection point 206 should refrain from exposing data to the updated endpoint 202 and/or the outdated endpoint 204. According to various implementations, the decision point 224 determines a risk associated with the updated endpoint 202 and a risk associated with the outdated endpoint 204 based on the report 222. The risk associated with the updated endpoint 202 may be based on a status of the updated hardware component 208 and/or a status of the updated software component 210. Similarly, the risk associated with the outdated endpoint 204 may be based on a status of the outdated hardware component 212 and/or the outdated software component 214. For instance, the risk associated with the updated endpoint 202 may be lower than the risk associated with the outdated endpoint 204, because the updated hardware component 208 and/or the updated software component 21 are associated with more recent updates than the outdated hardware component 212 and/or the outdated software component 214. In some cases, the risk associated with the outdated endpoint 204 may be based on the previous version of the outdated hardware component 212 and/or the outdated software component 214, which may be associated with at least one known security vulnerability. For example, the decision point may automatically decrease the risk associated with the outdated endpoint 204 upon determining that the version of the outdated hardware component 212 and/or the outdated software component 214 is a predetermined version that is associated with a security vulnerability. In some cases, a user (e.g., an administrator) may input the predetermined version into the decision point 224 upon recognizing the security vulnerability.

The decision point 224 may further assess the risks associated with the updated endpoint 202 and the outdated endpoint 204. In various implementations, the decision point 224 compares the risks to one or more thresholds. In some cases, the decision point 224 determines that the risk associated with the outdated endpoint 204 is greater than a particular threshold. In some cases, the risk associated with the updated endpoint 202 is equal to the threshold. In some implementations, the decision point 224 determines that the risk associated with the updated endpoint 202 is greater than the threshold.

The decision point 224 generates an instruction 226 based on the risks associated with the updated endpoint 202 and the outdated endpoint 204. In some examples, the instruction 226 indicates how the redirection point 206 should direct data to and from the updated endpoint 202 and/or the outdated endpoint 204.

For instance, an origin device 228 may transmit data traffic 230 to be processed at an endpoint, such as the updated endpoint 202 and/or the outdated endpoint 204. The redirection point 206 may distribute the data traffic 230 according to one or more policies. For instance, a policy may cause the redirection point 206 to direct the data traffic 230 to one or more endpoints with greater than a threshold percentage of available CPU capacity. In addition, the redirection point 206 may distribute the data traffic 230 based on the instruction 226 from the decision point 224. For example, the instruction 226 may prevent the redirection point 206 from forwarding or otherwise directing the data traffic 230 to the outdated endpoint 204, due to the relatively high risk posed by the outdated hardware component 212 and/or the outdated software component 214. Accordingly, the signaling 200 enables the redirection point 206 to protect the data traffic 230 from being exposed to any vulnerabilities posed by components of the outdated endpoint 204.

The behavior of the redirection point 206 can be modified over time based on changing statuses of the updated endpoint and/or the outdated endpoint 204. For example, an update and/or patch may be performed on the outdated endpoint 204, such that a vulnerability posed by the outdated hardware component 212 and/or the outdated software component 214 is no longer applicable. In various cases, the outdated endpoint 204 may transmit new second vulnerability data 220 indicating the update and/or patch. The reporting point 218 may transmit an updated report 222 to the decision point 224 based on the update and/or patch. In various implementations, the decision point 224 recalculates the risk associated with the outdated endpoint 204 based on the updated report 222 and determines that the risk is now lower than the applicable threshold. Accordingly, the decision point 224 may transmit an updated instruction 226 that enables the redirection point 206 to begin forwarding the data traffic 230 to the outdated endpoint 204.

In various implementations, components of the signaling 200 are encrypted for transmission between various entities. In addition, the components of the signaling 200 may be digitally signed to verify authenticity of the sender, in order to prevent a malicious actor from providing false vulnerability data, reports, or instructions.

Figure 3:
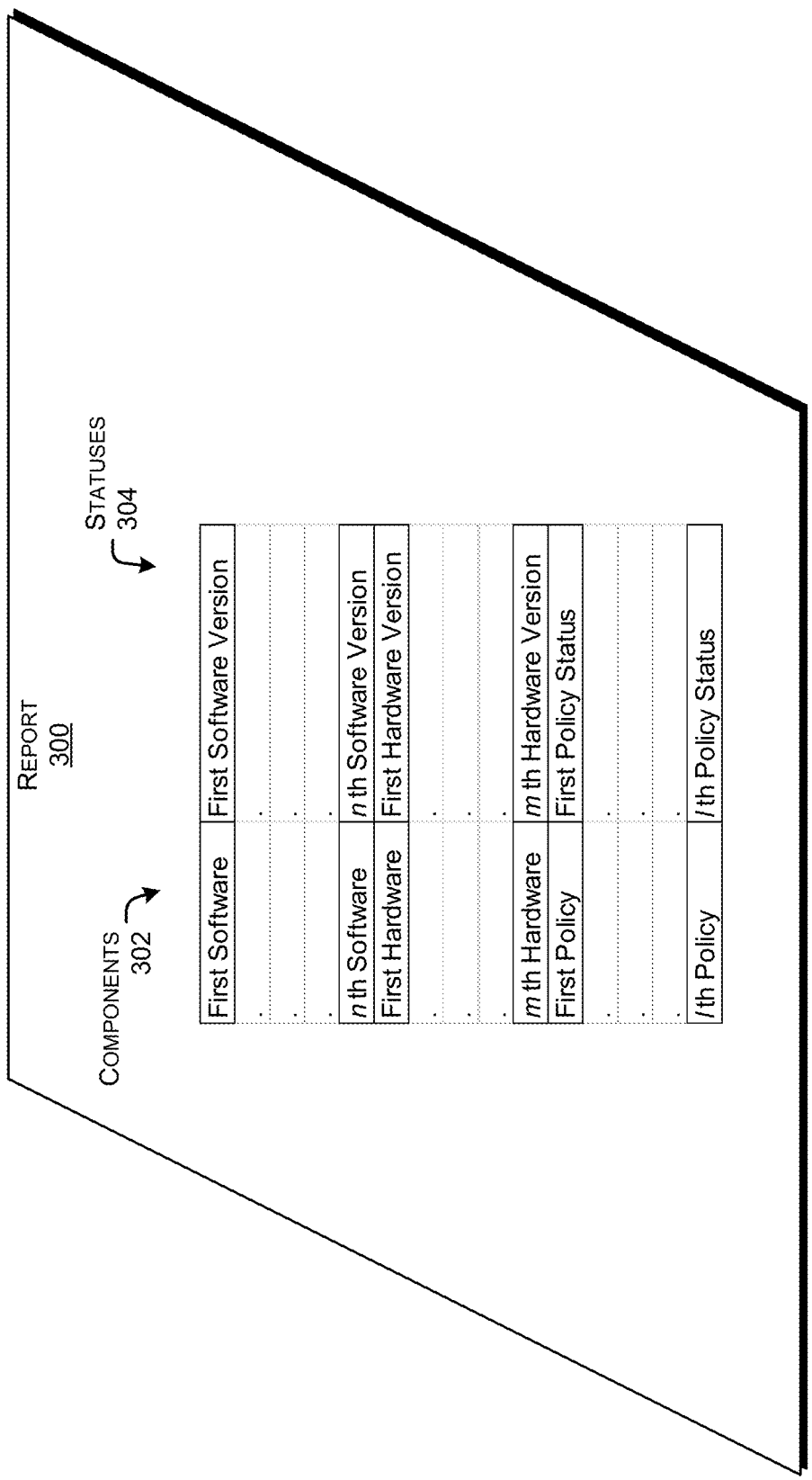
FIG. 3 illustrates an example report indicating statuses of various components of an endpoint.

FIG. 3 illustrates an example report 300 indicating statuses of various components of an endpoint. In some cases, the report 300 is the report 222 described above with reference to FIG. 2. The report 300 may be generated and/or transmitted by a reporting point, such as the reporting point 114 described above with reference to FIG. 1 and/or the reporting point 218 described above with reference to FIG. 2. In various implementations, the report 300 is received and/or analyzed by a decision point, such as the decision point 112 described above with reference to FIG. 1 and/or the decision point 224 described above with reference to FIG. 2.

In various implementations, the report 300 indicates components 302 and statuses 304 associated with at least one endpoint. In this description, it will be assumed that the report 300 indicates the components 302 and statuses 304 of a single endpoint, but implementations are not so limited. In some cases, the report 300 would indicate components 302 and statuses 304 of multiple endpoints communicatively coupled to a redirection point.

The endpoint includes multiple components 302, such as first to nth software components, first to mth hardware components, and first to /th policies. Examples of software components include an application, a VM, a hypervisor, an operating system, a service, a database, a compiler, or firmware. Examples of hardware components include a CPU, memory, an input device, an output device, a transceiver, or an ASIC. Examples of policies include a firewall policy protecting the endpoint, an access control policy protecting the endpoint (e.g., whether the endpoint is protected via MFA, whether the endpoint is password-protected, etc.), whether data associated with the endpoint is encrypted, or whether the endpoint is configured to transmit or receive data over a particular communication network (e.g., the Internet).

The components 302 respectively correspond to statuses 302. In various cases, the first to nth software components are respectively associated with first to nth software versions. The first to mth hardware components may be associated, respectively, with first to mth hardware versions. In addition, the first to /th policies are associated with first to lth policy statuses. For example, the policy statuses may indicate whether the policies are currently active or suspended.

In various implementations, the endpoint itself may indicate the components 302 and statuses 304 to the reporting point. In some implementations, the endpoint communicates the components 302 whose statuses 304 have been changed since the endpoint provided a previous communication to the reporting point. The reporting point may generate the report 300 based on the communications from the endpoint.

The decision point may determine a risk associated with the endpoint based on the report 300. In some examples, each status 304 may be associated with an increase or a decrease in a baseline risk level assigned to the endpoint. For instance, the endpoint may be initially assigned a risk of 0. The first software version may be an outdated software version. Accordingly, the decision point may increase the risk by 1 due to the outdated software version. In contrast, the first hardware version may be an updated hardware version, and may have addressed a previous security vulnerability that is still present on multiple hardware devices in a data center including the endpoint. Thus, the decision point may decrease the risk by 2 due to the updated hardware version. In some cases, the decision point may decrease the risk by 1 upon determining that the first policy is an MFA policy that protects the endpoint, and the first policy status indicates that the MFA policy is active. The decision point may increase and/or decrease the risk associated with the endpoint due to each status 304 of each component 302 indicated in the report 300.

Figure 4:
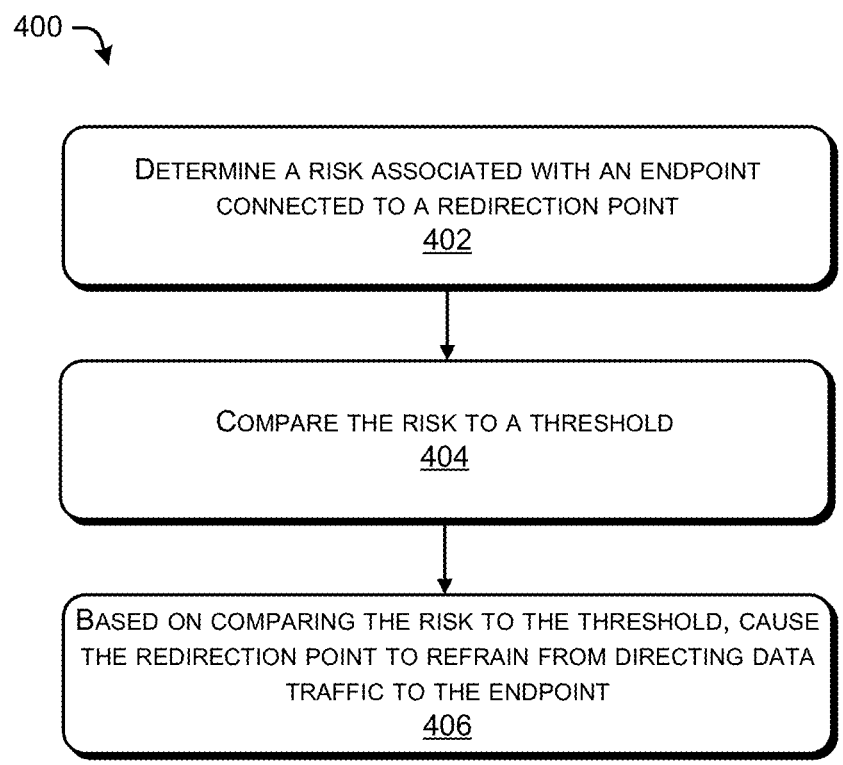
FIG. 4 illustrates an example process for controlling a redirection point based on endpoint risk.

FIG. 4 illustrates an example process 400 for controlling a redirection point based on endpoint risk. In various implementations, the process 400 is performed by an entity, such as at least one processor and/or a decision point (e.g., the decision point 112 and/or the decision point 224 described above with reference to FIGS. 1 and 2).

At 402, the entity determines a risk associated with an endpoint connected to a redirection point. In various implementations, the entity determines the risk based on a status of at least one of software, hardware, or a policy associated with the endpoint. In some cases, the status represents an update status of a component (e.g., software and/or hardware) of the endpoint. For instance, the status may indicate the version of the component operating on the endpoint. The version may be an outdated version of the component, such as there exists an updated version that was released by the manufacturer or provider of the component after the outdated version. In some examples, the status represents whether a security policy (e.g., a firewall policy, an MFA policy, etc.) is active in protecting the endpoint. In some cases, the entity may determine the risk based on determining that the endpoint is associated with a known security vulnerability.

The endpoint may include hardware, software, or a combination thereof. In some implementations, the endpoint is a server, an AP, a base station, a VM, a service, or some combination thereof. The redirection point may be at least one of a load balancer, a CASB, or a reverse proxy. In some cases, the endpoint and the redirection point are operating on the same physical device. In some implementations, the entity operates on the same physical device as the endpoint or the redirection point.

In some cases, the endpoint itself self-reports the status. The endpoint may output data indicating the status periodically, repeatedly, or in response to an event. For instance, the endpoint may provide the data in response to receiving an update and/or replacement of an existing component or in response to a policy changing on the endpoint.

At 404, the entity compares the risk to a threshold. In various implementations, the entity pre-stores the threshold. For instance, the threshold may be user-configured. In some cases, the entity determines that the risk is greater than the threshold. According to some implementations, the threshold is equal to a risk of another endpoint that is connected to the redirection point. Thus, the entity may determine that the endpoint poses a greater security risk to data traffic than other endpoints that are connected to the redirection point.

At 406, the entity, based on comparing the risk to the threshold, causes the redirection point to refrain from directing data to the endpoint. For example, the entity may transmit an instruction to the redirection point that prevents the redirection point from forwarding data to the endpoint. In various implementations, the redirection point will direct the data to one or more alternative endpoints. For instance, the entity may determine that the risk associated with an alternative endpoint is greater than the threshold, and the instruction may cause the redirection point to forward data to the alternative endpoint.

Figure 5:
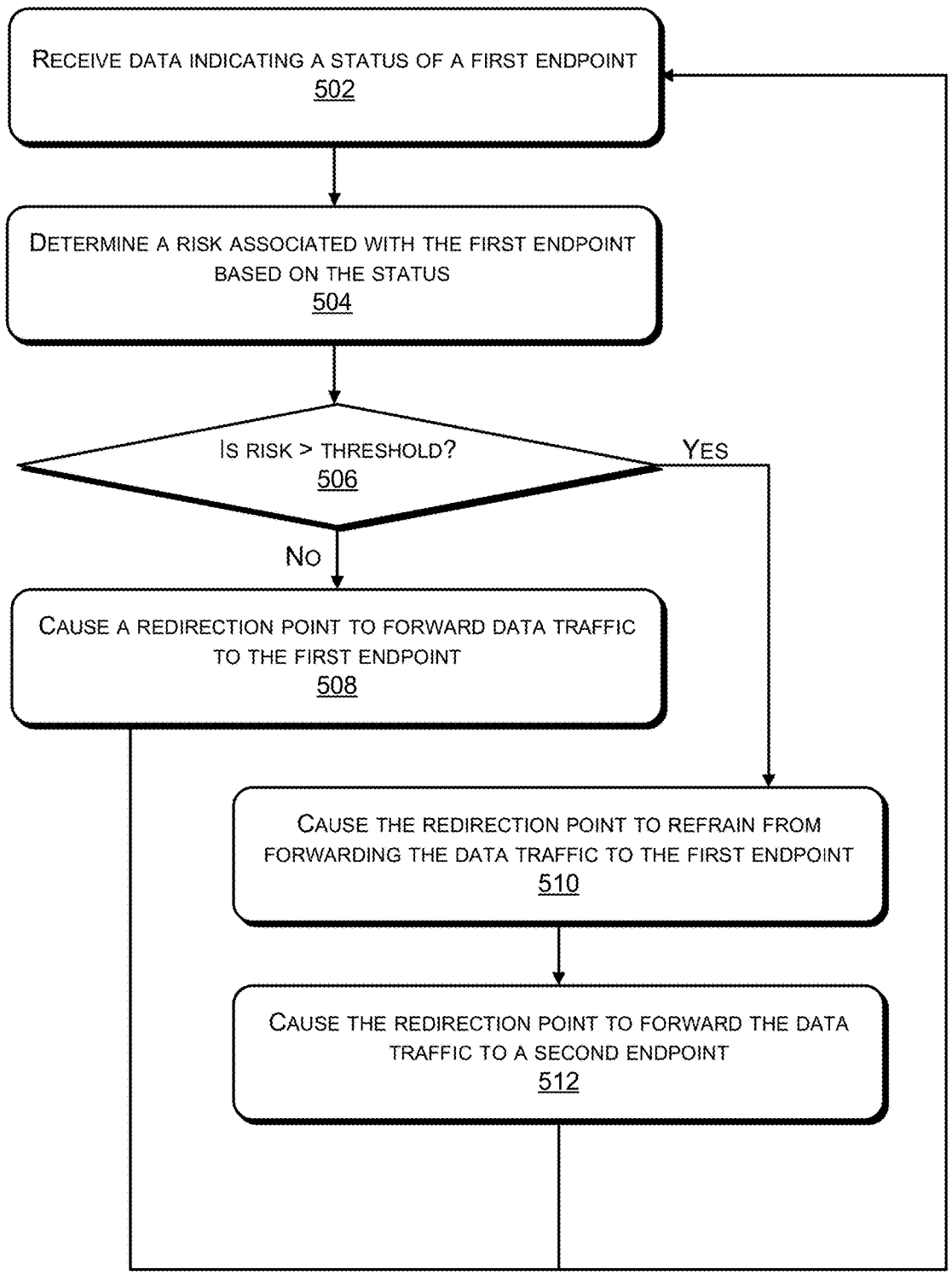
FIG. 5 illustrates another example process for controlling a redirection point based on endpoint risk.

FIG. 5 illustrates another example process 500 for controlling a redirection point based on endpoint risk. In various implementations, the process 500 is performed by an entity, such as at least one processor and/or a decision point (e.g., the decision point 112 and/or the decision point 224 described above with reference to FIGS. 1 and 2).

At 502, the entity receives data indicating a status of a first endpoint. In various implementations, the status is of at least one of software, hardware, or a policy associated with the first endpoint. In some cases, the status represents an update status of at least one component (e.g., software and/or hardware) of the first endpoint. For instance, the status may indicate the version of the component operating on the first endpoint. The version may be an outdated version of the component, such as there exists an updated version that was released by the manufacturer or provider of the component after the outdated version. Alternatively, the version of the component may be the updated version. In some examples, the status represents whether a security policy (e.g., a firewall policy, an MFA policy, etc.) is active in protecting the endpoint. In some cases, the status may indicate whether the first endpoint is associated with a known security vulnerability.

The first endpoint may include hardware, software, or a combination thereof. In some implementations, the first endpoint is a server, an AP, a base station, a VM, a service, or some combination thereof. The redirection point may be at least one of a load balancer, a CASB, or a reverse proxy. In some cases, the first endpoint and the redirection point are operating on the same physical device. In some implementations, the entity operates on the same physical device as the first endpoint or the redirection point.

In some cases, the first endpoint itself self-reports the vulnerability status. According to some examples, the first endpoint transmits data indicating the status to a reporting point, which indicates the status in a report that is received by the entity. The first endpoint may output data indicating the status periodically, repeatedly, or in response to an event. For instance, the endpoint may provide the data in response to receiving an update and/or replacement of an existing component or in response to a policy changing on the endpoint.

At 504, the entity determines a risk associated with the first endpoint based on the data. In various implementations, the risk may be a metric representing the overall vulnerability of the first endpoint due to the status of at least one of its components and/or policies. For example, the entity may increase the risk based on the first endpoint being associated with an outdated version of hardware and/or software and may decrease the risk based on the first endpoint being associated with an updated version of hardware and/or software. The entity may increase the risk based on the first endpoint lacking a security policy (e.g., a requirement for MFA before accessing data associated with the first endpoint) and may decrease the risk based on the first endpoint having the security policy. In various cases, the entity may increase the risk based on the first point being associated with a known security vulnerability.

At 506, the entity determines whether the risk is greater than a threshold. In some examples, the entity pre-stores the threshold. In various implementations, the threshold is based on at least one risk associated with another endpoint that is connected to the redirection point, such that the entity determines the relative security of the first endpoint compared to other endpoints connected to the redirection point.

If the entity determines that the risk is not greater than the threshold, then the process 500 proceeds to 508. At 508, the entity causes a redirection point to forward data traffic to the first endpoint. For instance, the entity may transmit an instruction to the redirection point that enables the redirection point to forward data traffic to the first endpoint. In some cases, the redirection point also distributes data traffic to other endpoints in addition to the first endpoint.

If, on the other hand, the entity determines that the risk is greater than the threshold, then the process 500 proceeds to 510. At 510, the entity causes the redirection point to refrain from forwarding the data traffic to the first endpoint. For instance, the entity may transmit an instruction to the redirection point that prevents the redirection point from transmitting data to the first endpoint. As a result, the data is not exposed to one or more vulnerabilities associated with the first endpoint.

At 512, the entity causes the redirection point to forward the data traffic to a second endpoint. In various implementations, the entity determines that a risk associated with the second endpoint is lower than the risk associated with the first endpoint. For instance, the entity may determine that the risk associated with the second endpoint is lower than the threshold. The instruction may enable the redirection point to transmit data to the second endpoint.

The process 500 may be performed repeatedly, periodically, or in response to events. For example, the entity may perform the process 500 each time the first endpoint is updated with a new version of software and/or hardware.

Figure 6:
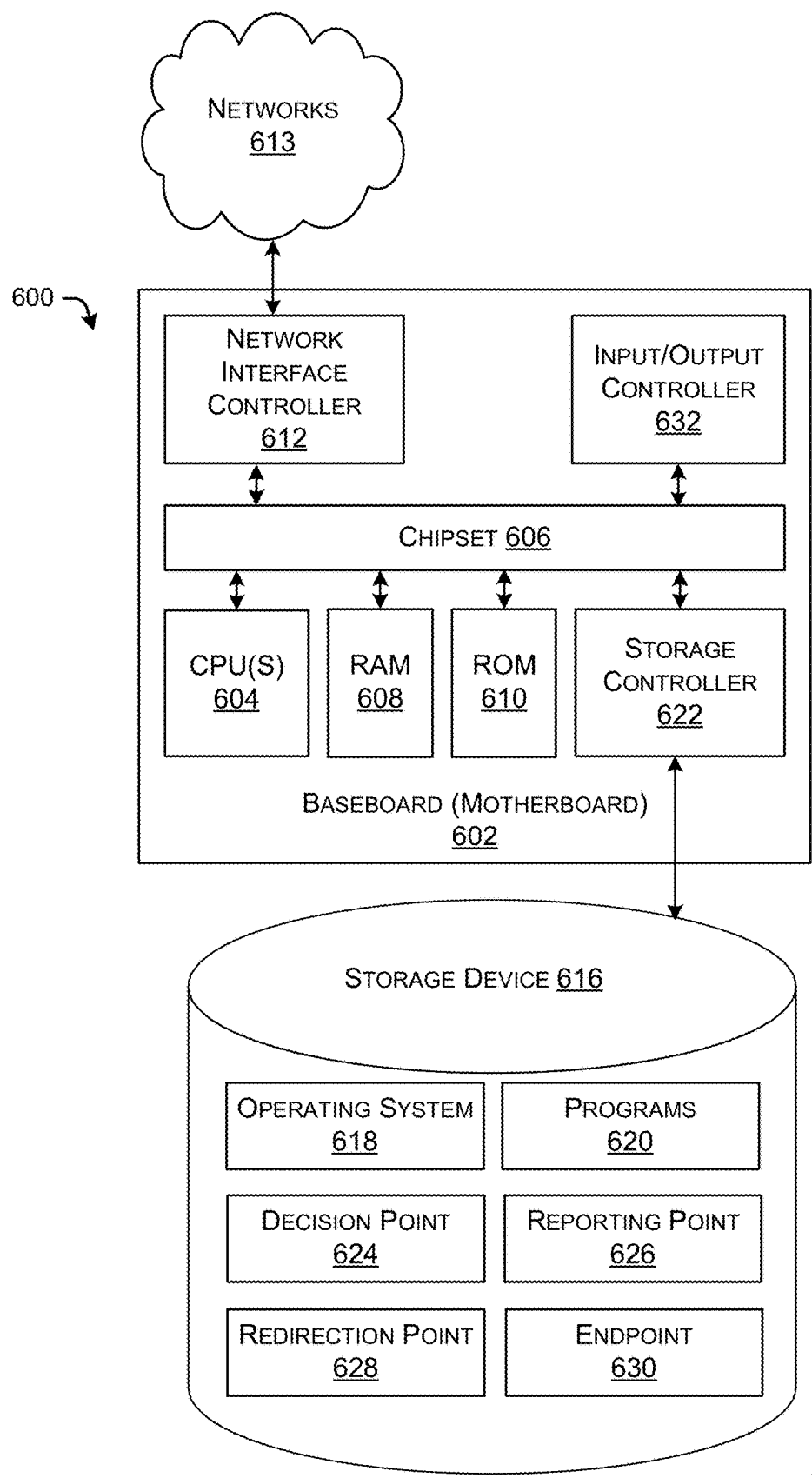
FIG. 6 shows an example computer architecture for a server computer capable of executing program components for implementing the functionality described above.

FIG. 6 shows an example computer architecture for a server computer 600 capable of executing program components for implementing the functionality described above. The computer architecture shown in FIG. 6 illustrates a conventional server computer, workstation, desktop computer, laptop, tablet, network appliance, e-reader, smartphone, or other computing device, and can be utilized to execute any of the software components presented herein.

The computer 600 includes a baseboard 602, or "motherboard," which is a printed circuit board to which a multitude of components or devices can be connected by way of a system bus or other electrical communication paths. In one illustrative configuration, one or more central processing units ("CPUs") 604 operate in conjunction with a chipset 606. The CPUs 604 can be standard programmable processors that perform arithmetic and logical operations necessary for the operation of the computer 600.

The CPUs 604 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 606 provides an interface between the CPUs 604 and the remainder of the components and devices on the baseboard 602. The chipset 606 can provide an interface to a random-access memory (RAM) 608, used as the main memory in the computer 600. The chipset 606 can further provide an interface to a computer-readable storage medium such as a read-only memory (ROM) 610 or non-volatile RAM (NVRAM) for storing basic routines that help to startup the computer 600 and to transfer information between the various components and devices. The ROM 610 or NVRAM can also store other software components necessary for the operation of the computer 600 in accordance with the configurations described herein.

The computer 600 can operate in a networked environment using logical connections to remote computing devices and computer systems through a network, such as the network 612. The chipset 606 can include functionality for providing network connectivity through a network interface controller (NIC) 612, such as a gigabit Ethernet adapter. The NIC 612 is capable of connecting the computer 600 to other computing devices over the network 613. It should be appreciated that multiple NICs 612 can be present in the computer 600, connecting the computer 600 to other types of networks and remote computer systems. In some instances, the NICs 612 may include at least on ingress port and/or at least one egress port.

The computer 600 can be connected to a storage device 616 that provides non-volatile storage for the computer. The storage device 616 can store an operating system 618, programs 620, and data, which have been described in greater detail herein. The storage device 616 can be connected to the computer 600 through a storage controller 622 connected to the chipset 606. The storage device 616 can consist of one or more physical storage units. The storage controller 616 can interface with the physical storage units through a serial attached small computer system interface (SCSI) (SAS) interface, a serial advanced technology attachment (SATA) interface, a fiber channel (FC) interface, or other type of interface for physically connecting and transferring data between computers and physical storage units.

The computer 600 can store data on the storage device 616 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 616 is characterized as primary or secondary storage, and the like.

For example, the computer 600 can store information to the storage device 616 by issuing instructions through the storage controller 622 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 600 can further read information from the storage device 616 by detecting the physical states or characteristics of one or more particular locations within the physical storage units.

In addition to the mass storage device 616 described above, the computer 600 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 600. In some examples, the operations performed by any network node described herein may be supported by one or more devices similar to computer 600. Stated otherwise, some or all of the operations performed by a network node may be performed by one or more computer devices 600 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 616 can store an operating system 618 utilized to control the operation of the computer 600. According to one embodiment, the operating system comprises the LINUX™ operating system. According to another embodiment, the operating system includes the WINDOWS' SERVER operating system from MICROSOFT Corporation of Redmond, Washington. According to further embodiments, the operating system can comprise the UNIX™ operating system or one of its variants. It should be appreciated that other operating systems can also be utilized. The storage device 616 can store other system or application programs and data utilized by the computer 600.

In one embodiment, the storage device 616 or other computer-readable storage media is encoded with computer-executable instructions which, when loaded into the computer 600, transform the computer from a general-purpose computing system into a special-purpose computer capable of implementing the embodiments described herein. These computer-executable instructions transform the computer 600 by specifying how the CPUs 604 transition between states, as described above. According to one embodiment, the computer 600 has access to computer-readable storage media storing computer-executable instructions which, when executed by the computer 600, perform the various processes described above with regard to FIGS. 1-5. The computer 600 can also include computer-readable storage media having instructions stored thereupon for performing any of the other computer-implemented operations described herein.

As illustrated in FIG. 6, the storage device 616 stores programs 620, as well as programs embodying at least one of a decision point 624, a reporting point 626, a redirection point 628, or an endpoint 230. The programs 620, the decision point 624, the reporting point 626, the redirection point 628, and the endpoint 230 may include instructions that, when executed by the CPU(s) 604, cause the computer 600 and/or the CPU(s) 604 to perform one or more operations.

The computer 600 can also include one or more input/output controllers 632 for receiving and processing input from a number of input devices, such as a keyboard, a mouse, a touchpad, a touch screen, an electronic stylus, or other type of input device. Similarly, an input/output controller 632 can provide output to a display, such as a computer monitor, a flat-panel display, a digital projector, a printer, or other type of output device. It will be appreciated that the computer 600 might not include all of the components shown in FIG. 6, can include other components that are not explicitly shown in FIG. 6, or might utilize an architecture completely different than that shown in FIG. 6.

In some instances, one or more components may be referred to herein as "configured to," "configurable to," "operable/operative to," "adapted/adaptable," "able to," "conformable/conformed to," etc. Those skilled in the art will recognize that such terms (e.g., "configured to") can generally encompass active-state components and/or inactive-state components and/or standby-state components, unless context requires otherwise.

As used herein, the term "based on" can be used synonymously with "based, at least in part, on" and "based at least partly on." As used herein, the terms "comprises/comprising/comprised" and "includes/including/included," and their equivalents, can be used interchangeably. An apparatus, system, or method that "comprises A, B, and C" includes A, B, and C, but also can include other components (e.g., D) as well. That is, the apparatus, system, or method is not limited to components A, B, and C.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method, comprising:
    causing first data traffic to be directed to a first endpoint connected to a redirection point and associated with a version of at least one of hardware or software;
    determining that the version of the at least one hardware or software is an outdated version of at least one of the hardware or software;
    determining a risk associated with the first endpoint based at least in part on the first endpoint being associated with the outdated version of at least one of the hardware or software, wherein the risk is usable by the redirection point to direct second data traffic that is subsequent to the first data traffic;
    determining that the risk exceeds a threshold, the threshold being based on one or more attributes associated with the second data traffic;
    determining that a second endpoint is associated with an updated version of at least one of the hardware or software, wherein the second endpoint being associated with the updated version is usable by the redirection point to direct the second data traffic that is subsequent to the first data traffic; and
    based on determining that the risk exceeds the threshold and that the second endpoint is associated with the updated version, causing the redirection point to direct the second data traffic to the second endpoint and to refrain from directing the second data traffic to the first endpoint.

2. The method of claim 1, wherein determining the risk associated with the first endpoint comprises determining that the first endpoint is associated with a security vulnerability.

3. The method of claim 1, wherein determining the risk associated with the first endpoint comprises:
    receiving, from the first endpoint, a report indicating an update performed on the first endpoint; and
    determining the risk associated with the first endpoint based on the report.

4. The method of claim 1, wherein the first endpoint comprises at least one of a first server, a first access point, a first base station, or a chain of one or more network nodes, and
    wherein the second endpoint comprises at least one of a second server, a second access point, a second base station, or a chain of one or more network nodes.

5. The method of claim 1, wherein the redirection point comprises at least one of a load balancer, a cloud access service broker (CASB), or a reverse proxy.

6. The method of claim 1 further comprising:
    receiving, from the first endpoint, a report indicating an update to the first endpoint;
    decreasing the risk associated with the first endpoint based on the report;
    based on decreasing the risk associated with the first endpoint, determining that the risk associated with the first endpoint is below the threshold; and
    based on determining that the risk associated with the first endpoint is below the threshold, causing the redirection point to direct the second data traffic to the first endpoint.

7. A system, comprising:
    at least one processor; and
    one or more non-transitory media storing instructions that, when executed by the system, cause the system to perform operations comprising:
        causing first data traffic to be directed to a first endpoint connected to a redirection point and associated with a version of at least one of hardware or software;
        determining that the version of at least one of the hardware or software is an outdated version of at least one of the hardware or software;
        determining a risk associated with the first endpoint based at least in part on the first endpoint being associated with the outdated version of at least one of the hardware or software, wherein the risk is usable by the redirection point to direct second data traffic that is subsequent to the first data traffic;
        comparing the risk to a threshold, the threshold being based on one or more attributes associated with the second data traffic;
        determining that a second endpoint is associated with an updated version of at least one of the hardware or software, wherein the second endpoint being associated with the updated version is usable by the redirection point to direct the second data traffic that is subsequent to the first data traffic; and
        based on comparing the risk to the threshold and determining that the second endpoint is associated with the updated version, causing the redirection point to direct the second data traffic to the second endpoint and to refrain from directing the second data traffic to the first endpoint.

8. The system of claim 7, wherein determining the risk associated with the first endpoint comprises determining that the first endpoint is associated with a security vulnerability.

9. The system of claim 7, wherein determining the risk associated with the first endpoint comprises:
    receiving, from the first endpoint, a report indicating an update performed on the first endpoint; and
    determining the risk associated with the first endpoint based on the report.

10. The system of claim 7, wherein the first endpoint comprises at least one of a first server, a first access point, or a first base station, and
    wherein the second endpoint comprises at least one of a second server, a second access point, or a second base station.

11. The system of claim 7, wherein the redirection point comprises at least one of a load balancer, a cloud access service broker (CASB), or a reverse proxy.

12. The system of claim 7, the operations further comprising:
    receiving, from the first endpoint, a report indicating an update to the first endpoint;
    adjusting the risk associated with the first endpoint based on the report;
    based on adjusting the risk associated with the first endpoint, re-comparing the risk associated with the first endpoint with the threshold; and based on re-comparing the risk associated with the first endpoint with the threshold, causing the redirection point to direct the second data traffic to the first endpoint.

13. A decision point, comprising:

at least one processor; and memory storing instructions that, when executed by the at least one processor, cause the decision point to perform operations comprising:

causing first data traffic to be directed to a first service hosted by a first server, the first server being connected to a load balancer;

determining a first risk associated with the first server hosting the first service by determining that the first server comprises a first version of hardware, wherein the first risk is usable by the load balancer to direct second data traffic that is subsequent to the first data traffic;

determining that the first risk exceeds a threshold, the threshold being based on one or more attributes associated with the second data traffic;

based on determining that the first risk exceeds the threshold, causing the load balancer to refrain from directing the second data traffic to the first service hosted by the first server;

determining a second risk associated with a second server hosting a second service by determining that the second server comprises a second version of hardware, the second server being connected to the load balancer, the first version of hardware being older than the second version of hardware, wherein the second risk is usable by the load balancer to direct the second data traffic that is subsequent to the first data traffic;

determining that the second risk is below the threshold; and based on determining that the second risk is below the threshold, causing the load balancer to direct the second data traffic to the second service hosted by the second server.

14. The decision point of claim 13, wherein determining the first risk associated with the first server comprises determining that the first server executes an outdated version of an operating system that is associated with a vulnerability.

15. The decision point of claim 14, the operations further comprise:

determining that the vulnerability has been patched such that the first server executes an updated version of the operating system without the vulnerability; and based on determining that the vulnerability has been patched, decreasing the first risk;

based on decreasing the first risk, determining that the first risk is below the threshold; and based on determining that the first risk is below the threshold, causing the load balancer to direct the second data traffic to the first service hosted by the first server and to the second service hosted by the second server.

16. The decision point of claim 14, the vulnerability being a first vulnerability, wherein the operations further comprise:

identifying a second vulnerability associated with a software version;

determining that the second server is operating the software version; and based on determining that the second server is operating the software version, increasing the second risk.

17. The method of claim 2, wherein determining the risk associated with the first endpoint comprises determining that the first endpoint is associated with an absence of a security policy.

18. The system of claim 7, wherein determining the risk associated with the first endpoint comprises determining that the first endpoint is associated with an absence of a security policy.

19. The method of claim 1, wherein the risk is usable by the redirection point to direct third data traffic that is subsequent to the first data traffic, and the threshold is a first threshold, the method further comprising:

determining that the risk is below a second threshold based on one or more attributes associated with the third data traffic and indicating risk sensitivity; and based on determining that the risk is below the second threshold, causing the redirection point to direct the third data traffic to the first endpoint.

20. The method of claim 1, wherein the one or more attributes associated with the second data traffic indicate that the second data traffic is sensitive data traffic.

\* \* \* \* \*